United States Patent Office 3,697,373
Patented Oct. 10, 1972

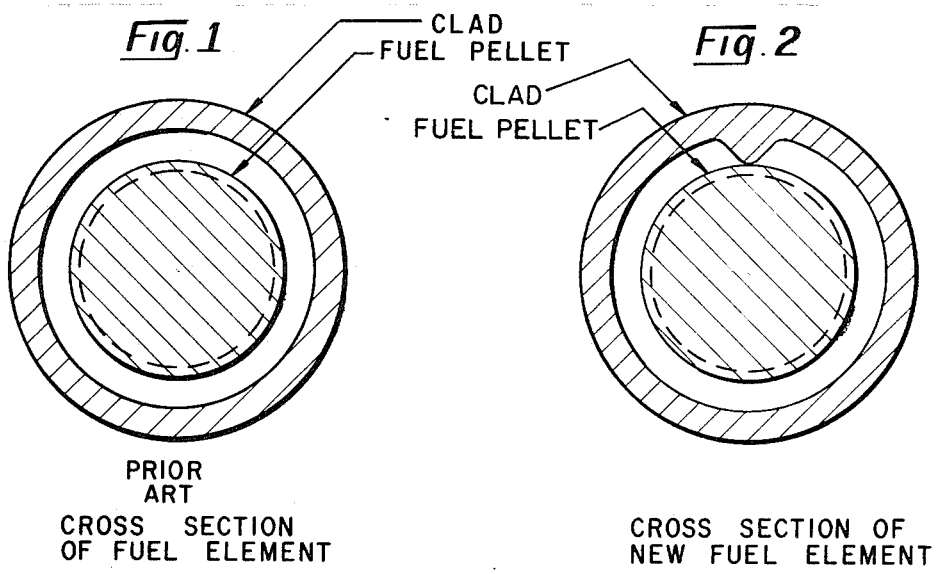
Fig. 1 — PRIOR ART CROSS SECTION OF FUEL ELEMENT
Fig. 2 — CROSS SECTION OF NEW FUEL ELEMENT
INVENTORS.
Donald E. Emon
Donald R. Riley
ATTORNEY.

3,697,373
NUCLEAR FUEL ELEMENT
Donald E. Emon, Rockville, and Donald R. Riley, Potomac, Md., assignors to the United States of America as represented by the United States Atomic Energy Commission
Filed June 2, 1970, Ser. No. 42,660
Int. Cl. G21c 3/18
U.S. Cl. 176—68     8 Claims

ABSTRACT OF THE DISCLOSURE

Overall fuel element clad strain due to fuel expansion during burnup is reduced by breaking the symmetry of the outer surface of the expanding fuel material. The inner surface of the clad is non-cylindrical so that at points of non-symmetry the slowly expanding fuel material is forced inward, thereby breaking the symmetry of the expanding fuel material and thus forming stress relieving paths.

BACKGROUND OF THE INVENTION

This invention was made in the course of, or under, work performed for the United States Atomic Energy Commission.

This invention relates to containers for nuclear fuel.

A thin outer shell is formed in fuel pellets during reactor operation as a result of fuel burnup. During reactor operation material is added to this shell from the inner reservoir of fuel material and from fission products, resulting in an ever-expanding shell of fuel material. When this shell reaches the clad it causes significant strain therein because of the shell's symmetric shape and high comprehensive strength. The strain on the clad caused by this expanding shell increases the chances of clad rupture and consequent fuel element failure. Attempts to alleviate this problem have heretofore generally been centered around the development of stronger clad alloys.

SUMMARY OF THE INVENTION

It is one object of our invention to provide a nuclear fuel element of improved design.

It is another object to provide a clad nuclear fuel element wherein the strain within the clad during fuel burn-up is reduced.

Other objects of our invention will become apparent from the following description and the attached claims in conjunction with the accompanying drawings.

In accordance with our invention we have provided a nuclear fuel element comprising a fuel pellet and a container for the fuel pellet having internal projections operating to break the symmetry of the fuel pellet as it expands during reactor operation. In present designs as the fuel pellet expands the clad exerts a compression stress on the pellet. In our design the internal clad projections cause a compression stress on the outside of the pellet and a tensile rupture stress on the inside of the outer shell which causes the fuel material in the area of the projections to fail and/or be directed inward, thereby forming stress relieving paths which reduce the strain on the clad.

Accordingly, our invention provides a fuel element having a longer life.

DESCRIPTION OF DRAWINGS

FIG. 1 shows a cross section of a fuel element not incorporating our invention.

FIG. 2 shows a cross section of one embodiment of our invention.

DESCRIPTION OF A PREFERRED EMBODIMENT

While the fuel element of our invention may be fabricated in many ways, we prefer to separately fabricate the fuel pellets, the structure comprising the clad and the ridges within this structure.

In one typical embodiment the fuel material in the form of a cylindrical pellet is disposed within a tubular clad structure provided with end caps. In one method of making this embodiment of our invention, one or more clad ridges are attached to an end cap which is then welded to one end of the clad tube so that the clad ridges lie along the inner surface of the tube. Fuel pellets are then inserted into the tube. As the fuel touches the clad ridges rather than the inner surface of the tube, a space will be formed between the fuel and the clad surface in the area of the clad ridges. The tube is then evacuated, an inert gas is added, and the other end cap is attached.

It is also possible to produce the clad ridges as an integral part of the clad by such processes as swaging, tube reducing, intraforming, flow rolling, rolling strip and welding.

The ridges or projections for the fuel element of our invention must be shaped so that high localized stresses are exerted on the fuel material and relatively low localized stresses are exerted on the cladding. In general a V-shaped ridge having the apex pointed toward the fuel material is preferred, with the apex being generally rounded as illustrated in FIG. 2.

EXAMPLES

In a typical tubular fuel element having a diameter of 0.250 inch the radial clearance between the fuel material and the clad initially may be 0.007 inch and the ridge, for an embodiment of our invention having a single ridge, may have a height of 0.005 to 0.006 inch and a base length of up to 0.015 inch.

It is obvious that the ridge may be formed of any material compatible with the fuel material and the rest of the clad structure, although it is preferably formed from the same material as the rest of the clad structure.

We claim:
1. A nuclear fuel element resistant to clad strain caused by fuel expansion due to fuel burnup comprising:
 (a) a cylindrical mass of nuclear fuel material having a substantially smooth, uninterrupted outer surface;
 (b) a container for said fuel material having an inner surface surrounding the fuel material;
 (c) a space between said inner surface of said container and said outer surface of said fuel material; and
 (d) at least one projecting ridge extending from the inner surface of the container to the outer surface of the fuel material, initially spacing the fuel material from the inner surface of the container, said at least one projecting ridge running the length of the fuel material and serving to break the symmetry of the fuel material as it expands during burnup.

2. The nuclear fuel element of claim 1 wherein said projecting ridge is part of said container.

3. The nuclear fuel element of claim 1 wherein said projection is separate from said container.

4. The nuclear fuel element of claim 1 wherein there are multiple projecting ridges.

3

5. The nuclear fuel element of claim 2 wherein there are multiple projecting ridges.

6. The nuclear fuel element of claim 3 wherein there are multiple projecting ridges.

7. The fuel element of claim 1 wherein the space formed between the inner surface of the container and the outer surface of the fuel material is filled by fuel material during burnup whereby heat transfer from the fuel material to the container is maximized.

8. The fuel element of claim 7 wherein the outside diameter of the container is 0.250 inch, the radial clearance between the outer surface of the fuel material and the inner surface of the container is 0.007 inch, and said at least one projecting ridge has a height of 0.005 to 0.006 inch and a base length of 0.015 inch.

4

References Cited

UNITED STATES PATENTS

| | | | |
|---|---|---|---|
| 3,325,375 | 6/1967 | Mogard | 176—81 X |
| 3,356,584 | 12/1967 | Ockert | 176—81 X |
| 3,387,148 | 6/1968 | Janner et al. | 176—68 X |
| 3,352,757 | 11/1967 | Dee et al. | 176—68 |
| 3,262,860 | 7/1966 | Zebroski | 176—68 X |
| 3,291,700 | 12/1966 | Brossa et al. | 176—72 X |
| 3,427,222 | 2/1969 | Biancheria et al. | 176—68 |

BENJAMIN R. PADGETT, Primary Examiner

G. G. SOLYST, Assistant Examiner

U.S. Cl. X.R.

176—72, 81